United States Patent
Bhattacharya

(10) Patent No.: US 10,402,570 B2
(45) Date of Patent: Sep. 3, 2019

(54) METHOD AND DEVICE FOR SOFTWARE RISK MANAGEMENT WITHIN INFORMATION TECHNOLOGY (IT) INFRASTRUCTURE

(71) Applicant: Wipro Limited, Bangalore (IN)

(72) Inventor: Sourav Sam Bhattacharya, Fountain Hills, AZ (US)

(73) Assignee: Wipro Limited, Bangalore (IN)

( * ) Notice: Subject to any disclaimer, the term of this patent is extended or adjusted under 35 U.S.C. 154(b) by 248 days.

(21) Appl. No.: 15/452,850

(22) Filed: Mar. 8, 2017

(65) Prior Publication Data

US 2018/0260572 A1    Sep. 13, 2018

(51) Int. Cl.
*H04L 29/06* (2006.01)
*G06F 21/57* (2013.01)

(52) U.S. Cl.
CPC ...... *G06F 21/577* (2013.01); *G06F 2221/033* (2013.01)

(58) Field of Classification Search
None
See application file for complete search history.

(56) References Cited

U.S. PATENT DOCUMENTS

| 7,530,104 | B1 * | 5/2009 | Thrower | G06F 21/554 |
| | | | | 713/188 |
| 9,268,944 | B2 * | 2/2016 | Bhattacharya | G06F 21/577 |
| 10,050,988 | B2 * | 8/2018 | Oliphant | G06F 21/57 |
| 10,154,055 | B2 * | 12/2018 | Oliphant | H04L 63/1416 |
| 2006/0010497 | A1 * | 1/2006 | O'Brien | G06Q 10/10 |
| | | | | 726/26 |
| 2013/0318601 | A1 * | 11/2013 | Thorley | G06F 21/552 |
| | | | | 726/22 |
| 2014/0236788 | A1 * | 8/2014 | Blake | G06F 21/10 |
| | | | | 705/34 |
| 2015/0227745 | A1 * | 8/2015 | Bhattacharya | G06F 21/577 |
| | | | | 726/25 |

(Continued)

FOREIGN PATENT DOCUMENTS

| EP | 2 385 676 | 11/2011 |
| WO | WO 2012/007402 | 1/2012 |

*Primary Examiner* — Jeffery L Williams
(74) *Attorney, Agent, or Firm* — Finnegan, Henderson, Farabow, Garrett & Dunner, LLP

(57) ABSTRACT

This disclosure relates to a method and device for software risk management within an IT infrastructure. The method includes computing security risk factors for a plurality of software components based on available executables for the plurality of software components. A set of software components are identified from the plurality of components, such that, a security risk factor for each of the set of software components is greater than a predefined threshold. Thereafter, a compensating control is activated for at least one of the set of software components, when a compensating control mechanism is available for each of the at least one software component and the compensating control mechanism satisfies control criteria. The method includes dynamically deploying at least one continuous monitoring tool satisfying monitoring criteria, to monitor each of at least one remaining software component, for which compensating control mechanism is not available, for a predefined duration.

16 Claims, 8 Drawing Sheets

(56) References Cited

U.S. PATENT DOCUMENTS

| | | | |
|---|---|---|---|
| 2016/0036852 A1* | 2/2016 | Oliphant | G06F 21/57 |
| | | | 726/23 |
| 2016/0088010 A1* | 3/2016 | Oliphant | H04L 63/1416 |
| | | | 726/23 |
| 2016/0343083 A1* | 11/2016 | Hering | G06Q 40/08 |
| 2018/0260572 A1* | 9/2018 | Bhattacharya | G06F 21/577 |

* cited by examiner

METHOD AND DEVICE FOR SOFTWARE RISK MANAGEMENT WITHIN INFORMATION TECHNOLOGY (IT) INFRASTRUCTURE

TECHNICAL FIELD

This disclosure relates generally to software risk management and more particularly to method and device for software risk management within Information Technology (IT) infrastructure.

BACKGROUND

Most IT infrastructures in a practical deployment environment include multiple Commercial-Off-The-Shelf (COTS) software components. Many of these components are legacy software, whose source code may be unavailable, and often the company or person who developed these software components may not be available or reachable. Many other software components may have become stale in their versions, and their originating (source) company may no longer support the outdated software release.

Several other software components may have been internally developed, but at the time of development, software security was relatively unimportant and proper attention to code security defects may not have been given. Moreover, the developers and testers involved in such software development projects may no longer be with the enterprise. Few other software components are unrelated to technological applications, for example, they may be used in payroll, marketing, or other domains where the everyday users simply are unware or and unwilling to spend the added effort to accommodate security defect mitigation techniques.

As a result, the software ensemble, as a whole, is subject to growing number of security vulnerabilities and risk exposure. The top level stakeholders of the enterprise using the software ensemble is responsible, civilly and sometimes criminally, for a breach in any one of these COTS software components. However, as the COTS software component's security risks are unknown, it is a problem to estimate security risk at each COTS software component level, and then to scale up the estimation process from one component to multiple different COTS software components.

SUMMARY

In one embodiment, a method of software risk management within an Information Technology (IT) infrastructure is disclosed. The method includes computing, by a risk management device, security risk factors for a plurality of software components based on availability executables for the plurality of software components; identifying, by a risk management device, a set of software components from the plurality of components in response to computing, wherein a security risk factor for each of the set of software components is greater than a predefined threshold; activating, by the risk management device, compensating control for at least one of the set of software components, when a compensating control mechanism is available for each of the at least one software component and the compensating control mechanism satisfies control criteria; and dynamically deploying, by the risk management device, at least one continuous monitoring tool satisfying monitoring criteria, to monitor each of at least one remaining software component in the set of software components for a predefined duration, wherein a compensating control mechanism is not available for each of the at least one remaining software component.

In another embodiment, a risk management device for managing software risk within an Information Technology (IT) infrastructure is disclosed. The risk management device includes a processor; and a memory communicatively coupled to the processor, wherein the memory stores processor instructions, which, on execution, causes the processor to compute security risk factors for a plurality of software components based on availability executables for the plurality of software components; identify a set of software components from the plurality of components in response to computing, wherein a security risk factor for each of the set of software components is greater than a predefined threshold; activate compensating control for at least one of the set of software components, when a compensating control mechanism is available for each of the at least one software component and the compensating control mechanism satisfies control criteria; and dynamically deploy at least one continuous monitoring tool satisfying monitoring criteria, to monitor each of at least one remaining software component in the set of software components for a predefined duration, wherein a compensating control mechanism is not available for each of the at least one remaining software component.

In yet another embodiment, a non-transitory computer-readable storage medium is disclosed. The non-transitory computer-readable storage medium has instructions stored thereon, a set of computer-executable instructions causing a computer comprising one or more processors to perform steps comprising computing, by a risk management device, security risk factors for a plurality of software components based on availability executables for the plurality of software components; identifying, by a risk management device, a set of software components from the plurality of components in response to computing, wherein a security risk factor for each of the set of software components is greater than a predefined threshold; activating, by the risk management device, compensating control for at least one of the set of software components, when a compensating control mechanism is available for each of the at least one software component and the compensating control mechanism satisfies control criteria; and dynamically deploying, by the risk management device, at least one continuous monitoring tool satisfying monitoring criteria, to monitor each of at least one remaining software component in the set of software components for a predefined duration, wherein a compensating control mechanism is not available for each of the at least one remaining software component.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
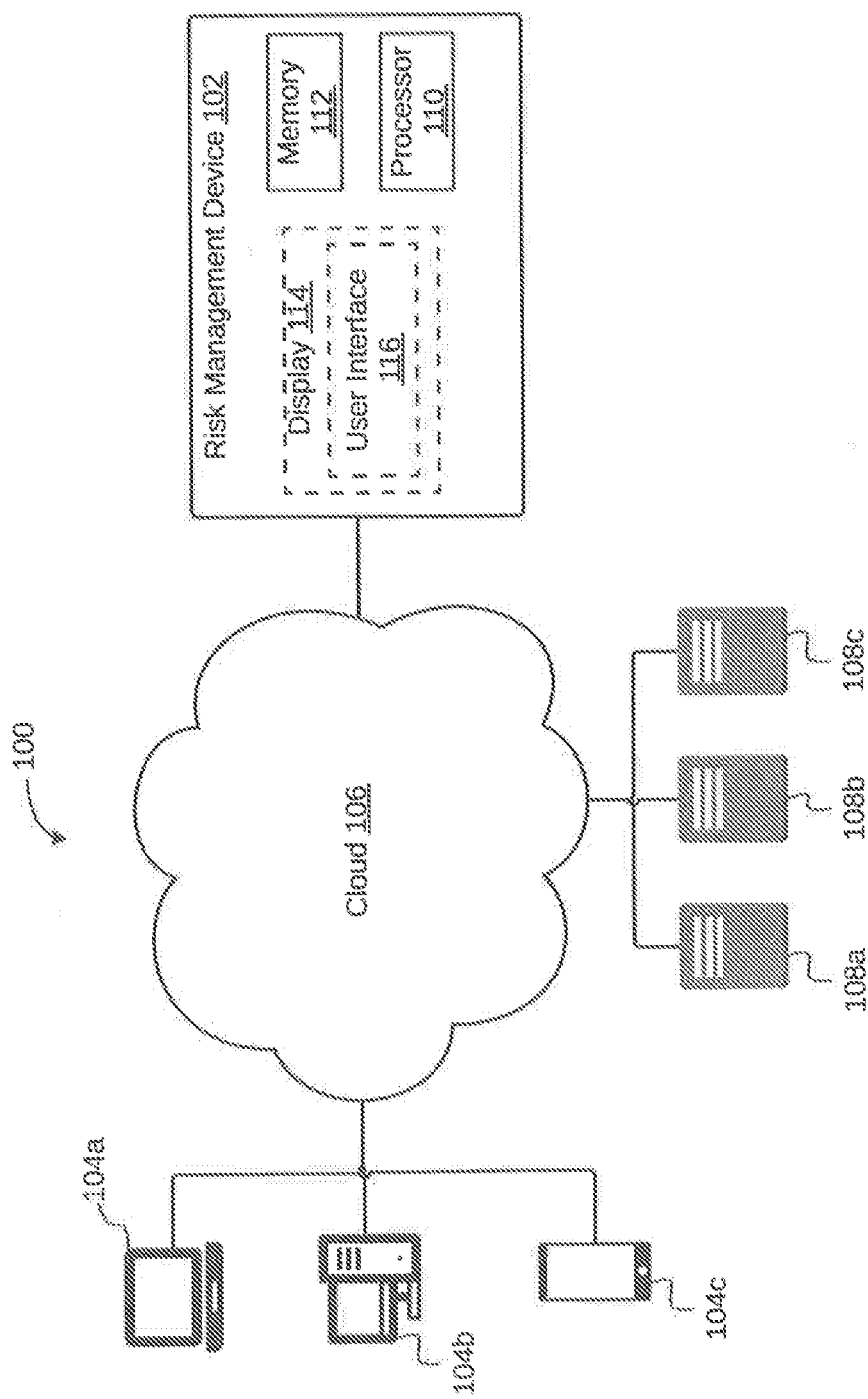
FIG. 1 illustrates a system for managing software risk within an Information Technology (IT) infrastructure, in accordance with an embodiment.

Additional illustrative embodiments are listed below. In one embodiment, a system 100 for software risk management in an Information Technology (IT) infrastructure is illustrated in FIG. 1. System 100 includes a risk management device 102 that manages software risks within the IT infrastructure, which includes a plurality of computing devices 104 (for example, a laptop 104a, a desktop 104b, and a smart phone 104c) and a cloud 106. Other examples of plurality of computing devices 104, may include, but are not limited to an application server, a phablet, and a tablet.

Risk management device 102 and plurality of computing devices 104 access cloud 106, through wired or wireless means. Cloud 106 may provide various service modes, for example, but not limited to Software as a Service (SaaS), Platform as a Service (PaaS), or Infrastructure as a Service (IaaS). Thus, cloud 106 may include or represent multiple IT assets, for example, third party software components that may be accessed and/or utilized by plurality of computing devices 104 and risk management device 102. For a lot of these third party software components, a source code is not provided, as a result, it becomes difficult to assess and estimate the risk associated with such software components. To resolve this, risk management device 102 determines risk associated with such software components and devises a risk management strategy. This is explained in detail in conjunction with FIG. 2-6. Risk management device 102 may also communicate with a plurality of servers 108 that may include one or more of, but is not limited to a licensing server 108a, a commissioning server 108b, and a decommissioning server 108c. Licensing server 108a is a repository for compensating control software. Commissioning Server 108b activates installation of the compensating control software from licensing server 108a to risk management device 102. Decommissioning server 108c is the gateway between risk management device 102 and licensing server 108a. In an embodiment, plurality of servers 108 may be a part of cloud 106.

Risk management device 102 includes a processor 110 that is communicatively coupled to a memory 112. Memory 112 further includes various modules that enable risk management device 102 to perform software risk management in the IT infrastructure. These modules are explained in detail in conjunction with FIG. 2. Risk management device 102 may further include a display 114 having a User Interface (UI) 116 that may be used by a user or administrator to provide inputs and to interact with risk management device 102. Display 114 may further be used to display result of various analysis performed while performing software risk management.

Figure 2:
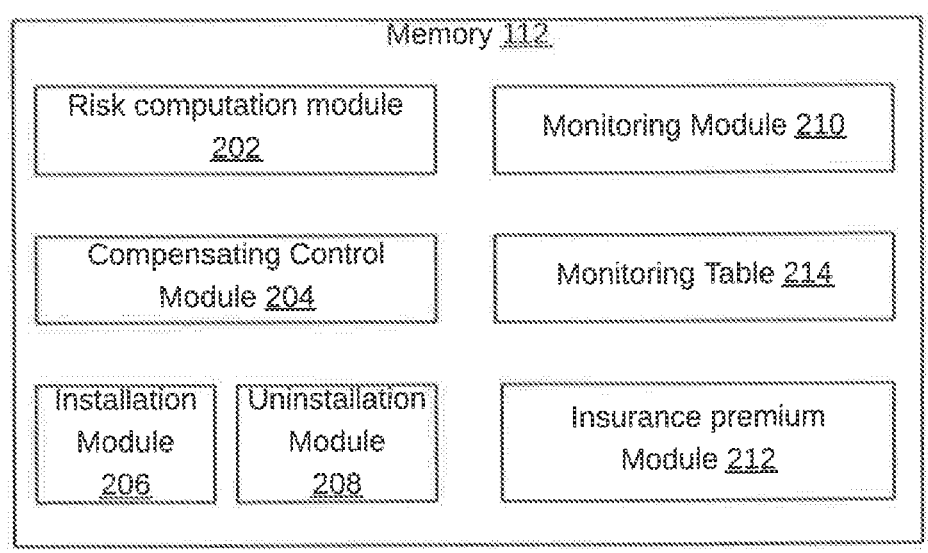
FIG. 2 is a block diagram illustrating various modules in a memory of a risk management device configured to manage software risk within an IT infrastructure, in accordance with an embodiment.

Referring now to FIG. 2, a block diagram of various modules stored in memory 112 of risk management device 102 configured to perform software risk management is illustrated, in accordance with an embodiment. Memory 112 includes a risk computation module 202, a compensating control module 204, an installation module 206, an uninstallation module 208, a monitoring module 210, and an insurance premium module 212.

Risk computation module 202 computes security risk factors for a plurality of software components based on available executables for the plurality of software components. A security risk factor for one of the plurality of software components may be computed based on individual security risk of the software component without dependency on other software components in the plurality of software components. The security risks are then converted into security risk factors by grading these security risks across a security risk factor scale. This is further explained in detail in conjunction with FIG. 3. Alternatively, risk computation module 202 computes the security risk factors based on interdependencies amongst the plurality of software components. The interdependencies are based on one or more data-flow interdependencies between the plurality of software components and human usage interdependencies relating to the usage of the plurality of software components. This is further explained in detail in conjunction with FIG. 4.

Based on security risk factors that have been computed for the plurality of software components, compensating control module 204 identifies a set of software components from the plurality of components, such that, a security risk factor for each of the set of software components is greater than a predefined threshold. Once the set of software components have been identified, compensating control module 204 determines one or more software components within this set, such that, these software components have a compensating control mechanism available and the compensating control mechanism satisfies control criteria. The control criteria may include one or more of cost associated with the compensating control mechanism and its performance overhead.

In an embodiment, for a given software component, compensating control module 204 obtains a list of security defects in that software component from risk computation module 202. For each of these security defects, compensating control module 204 determines whether a compensation control mechanism is available or not and whether the control criteria of cost and performance overhead are satisfied or not. Based on a combination of all these conditions, compensating control module 204 makes a decision, whether to activate the compensating control mechanism or not.

Once compensating control module 204 reaches a conclusion to activate the compensating control for the software component, compensating control module 204 sends an initiate command to commissioning server 108b, which further communicates with licensing server 108a to obtain a license for the compensating control that is to be activated. Once the license is obtained, licensing server 108a communicates with installation module 206 to install the obtained license in order to resolve one or more security risks associated with that software component. Installation module 206, being OS and platform specific, installs the obtained license to a target asset, which may be a host or server on which the software component is executed. In a scenario where either the license for the compensating control has expired or when the software component no longer requires the compensating control, decommissioning server 108c activates uninstallation module 208 to uninstall the license and thereafter communicates with licensing server 108a. This is further explained in detail in conjunction with FIG. 3.

Once the compensating control has been activated for the one or more software components from the set, those software components are identified, which do not have any available compensation control mechanism (or solution) to resolve security risks within these software components. For the one or more remaining software components, monitoring module 210 dynamically deploys one or more continuous monitoring tools that would monitor the one or more remaining software components for a predefined duration. A continuous monitoring tool monitors a software component to determine whether that software component is at a security risk and is under attack or not.

Each of the one or more continuous monitoring tools have to satisfy monitoring criteria to be deployed. The monitoring criteria may include one or more of, but is not limited to cost associated with a monitoring tool or solution and performance overheads. Monitoring module 210 stores data regarding operating the different continuous monitoring tools in a monitoring table 214, which is a data structure. Monitoring table 214 stores a Boolean field of set/reset, and is read by the continuous monitoring tools to turn On/Off.

After activating the compensating control and deploying the continuous monitoring tools, insurance premium module 212 determines an insurance aggregate limit and an insurance premium for each of the plurality of software components. The insurance aggregate limit and the insurance premium are determined based on security risk factors computed for the plurality of software components and asset values associated with them. This is explained in detail in conjunction with FIG. 6.

Figure 3:
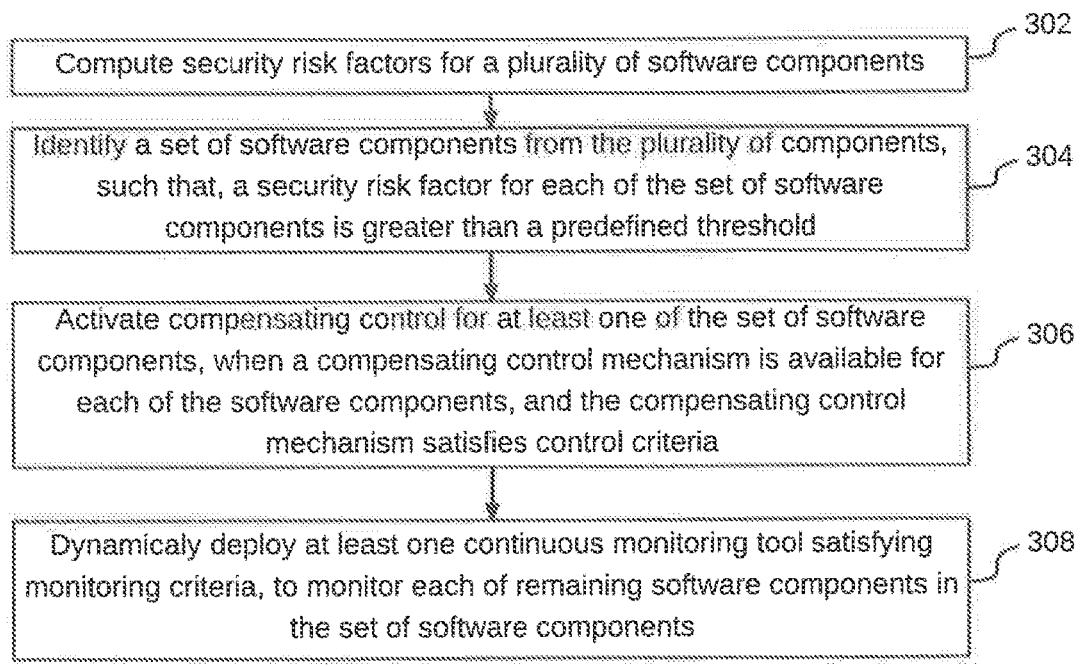
FIG. 3 illustrates a first flowchart of a method for software risk management within an IT infrastructure, in accordance with an embodiment.

Referring now to FIG. 3, a first flowchart of a method for software risk management within an IT infrastructure, in accordance with an embodiment. At step 302, risk management device 102, computes security risk factors for a plurality of software components based on available executables for the plurality of software components. As discussed in FIG. 1, the plurality of software components are available on cloud 106 and may be Commercial Off The Shelf (COTS) software components that are provided by a third party software provider. The source code for these software components is mostly not available, either because of being provided by a third party software provider or because of other reasons discussed in detail in the background section. For each of the plurality of software components, software IDs and server locations, which are Internet Protocol (IP) addresses of the servers that host these software components, are determined. The total number of software components in cloud 106 is determined, such that, no software component is counted twice. In other words, irrespective of the number of deployments of a particular software component across the IT infrastructure, the software component is only counted once.

A security risk factor for one of the plurality of software components may be computed based on individual security risk of the software component without dependency on other software components in the plurality of software components. To compute the security risk factor, a security risk assessment method for software executables provided by third party software provider may be utilized. This security assessment method is disclosed in detail in U.S. Pat. No. 9,268,944, titled "System and method for sampling based source code security audit," filed on: Feb. 10, 2014, which is incorporated herein by reference in its entirety. This risk assessment method is applied to each software component, whose executable is used but source code is unavailable, in order to determine an associated security risk. In an embodiment, security risks may also be determined for those software components, for which the source code is available. In this case, any existing security assessment method may be used.

The security risks are then converted into security risk factors by grading these security risks across a security risk factor scale. By way of an example, the security risk factor scale may be from 1 to 10, 1 being associated with lowest security risk and 10 being associated with the highest security list. A range of security risk values may be predefined for each of these security risk factor scales and security risk factors may be accordingly determined for different software components. Risk management device 102 may store security risk factors computed for each of the plurality of software components in a security risk table within memory 112. The security risk table would include a software ID of each software component (which may be a numeric ID that uniquely identifies each software component in cloud 106) and the security risk factor computed for that software component.

Alternatively, the security risk factors may be computed based on interdependencies amongst the plurality of software components. The interdependencies are based on one or more data-flow interdependencies between the plurality of software components and human usage interdependencies relating to the usage of the plurality of software components. This is further explained in detail in conjunction with FIG. 4.

Based on security risk factors that have been computed for the plurality of software components, risk management device 102, at step 304, identifies a set of software components from the plurality of components, such that, a security risk factor for each of the set of software components is greater than a predefined threshold. By way of an example, the administrator may fix the predefined threshold as the security risk factor of 5. Thus, the set of software components will include only those software components for which the security risk factor is greater than 5. For all other software components that have a security risk factor of 5 or below, it would be assumed that they do not pose any security risk that would require a further evaluation.

Once the set of software components have been identified, risk management device 104 determines one or more software components within this set, such that, these software components have a compensating control mechanism available and the compensating control mechanism satisfies control criteria. The control criteria may include one or more of cost associated with the compensating control mechanism and its performance overhead. Based on this, risk management device 102, at step 306, activates compensating control for the one or more software components using the associated compensating control mechanism. A compensating control mechanism, for example, may be a patch fix for a security defect, where the patch fix is released by vendor of the software component In an embodiment, for a given software component, a list of security defects in that software component is first obtained based on the security risk determined by risk management device 102. For each of these security defects, it is determined whether a compensation control mechanism is available or not and whether the control criteria of cost and performance overhead are satisfied or not. Based on a combination of all these conditions, risk management device 102 makes a decision, whether to activate the compensating control mechanism or not. In an exemplary embodiment, for a given software component, the logic used by risk management device 102 to reach a decision for activating a compensating control mechanism is depicted in the table 1 given below:

TABLE 1

| Security Defect Present? | Compensating Control Mechanism available? | Cost is Acceptable? | Performance is acceptable? | Activation Decision |
|---|---|---|---|---|
| Yes | Yes | Yes | Yes | Activate Compensating Control |
| Yes | Yes | No | No | Temporarily Activate. Withdraw after cost or performance becomes non-acceptable |
| Yes | Yes | Yes | No | |
| Yes | Yes | No | Yes | |

Based on the above, once risk management device 102 reaches a conclusion to activate the compensating control for the software component, risk management device 102 sends an initiate command to commissioning server 108b, which further communicates with licensing server 108a to obtain a license for the compensating control that is to be activated. Once the license is obtained, licensing server 108a communicates with installation module 206 in risk management device 102 to install the obtained license in order to resolve one or more security risks associated with that software component. In a scenario where either the license for the compensating control has expired or when the software component no longer requires the compensating control, decommissioning server 108c activates uninstallation module 208 in risk management device 102 to uninstall the license. This decision of uninstalling a license may either be automatically initiated or may be initiated through manual controls based on factors of cost or performance overheads. This selective uninstalling of a license when not required, saves on cost, which might have been unnecessarily incurred.

Once the compensating control has been activated for the one or more software components from the set, one or more remaining software components are left in the set, for which compensating control mechanisms are not available. In other words, those software components are identified, which do not have any available compensation control mechanism (or solution) to resolve security risks within these software components. For the one or more remaining software components, risk management device 102 dynamically deploys one or more continuous monitoring tools that would monitor the one or more remaining software components for a predefined duration, at step 308. A continuous monitoring tool monitors a software component to determine whether that software component is at a security risk and is under attack or not. Examples of such monitoring tools may include, but are not limited to Tenable Security Center or Trend Micro Deep Security.

The deployment of continuous monitoring tools thus serves to bridge the gap when no resolution is available for security defects identified in one or more software components. As a result, instead of keeping open vulnerabilities in software components and making an organization owning the IT infrastructure liable, continuous monitoring tools should be temporarily deployed, until a risk mitigation strategy by way of compensating control is available. Such scenarios mostly occur when a Zero-day attack is discovered, or a recently discovered attack becomes known as an open vulnerability.

Moreover, the control monitoring tool are deployed for the predefined duration that is adaptive and may vary based on occurrence of one or more events or satisfaction of one or more criteria. Thus, the deployment of continuous monitoring tools is temporary, thereby avoiding a permanent deployment which would have had an adverse effect on cost and performance overhead. The temporary and dynamic deployment of continuous monitoring tools helps providing the organization with minimum time fuse that may be used to develop a permanent security fix.

Each of the one or more continuous monitoring tools have to satisfy monitoring criteria to be deployed. The monitoring criteria may include one or more of, but is not limited to cost associated with a monitoring tool or solution and performance overheads. In an exemplary embodiment, the logic used by risk management device 102 to decide whether or not to deploy a continuous monitoring tool or solution for a software component, is depicted in the table 2 given below:

TABLE 2

| Zero-Day or Other Recent Vulnerability Detected in the software component? | Is a compensating control mechanism (mitigation strategy) available? | Is cost and performance overhead of permanently deploying a continuous monitoring tool acceptable? | Deployment Decision |
|---|---|---|---|
| Yes | No | No | Deploy transient Continuous Monitoring |
| Yes | Yes | No | Not required |
| Yes | Yes | Yes | Not required |
| Yes | No | Yes | Transient deployment not necessary. May deploy permanently |
| No | N/A | N/A | Not required |

Risk management device 102 stores data regarding operating the different continuous monitoring tools in a monitoring table, which is a data structure. The monitoring table stores a Boolean field of set/reset, and is read by the continuous monitoring tools to turn On/Off. In other words, the monitoring table is later used by continuous monitoring tools to govern their respective operation. In an embodiment, the operation of the continuous monitoring tools may be controlled by an Extract, Transform, Load (ETL) script in order to execute these tools on a timer basis.

When the deployment decision is that of transient deployment, risk management device 102 deploys and thereafter un-deploys the continuous monitoring tool on expiry of the predefined duration. The continuous monitoring tools, when deployed without absolute necessity, incurs performance overhead and added cost, thus the selective and dynamic deployment of the continuous monitoring tools that adapts to the capabilities (or lack thereof) in compensating controls.

In an embodiment, additional security control (over and above the monitoring tools) may be provided during the period a security defect is detected, but there is no defect mitigated available yet. To this end, perimeter control agents are deployed on demand. Demand is per activation of transient monitoring, specific to a particular type of attack. The perimeter control may be customized (by vulnerable server, and vulnerability type), with minimal performance overhead, since it is deployed only on demand (during the temporary period a vulnerability is detected but not mitigated yet). Perimeter control agents (which may be port filtering scripts) are deployed in advance at the firewalls, however, they are not activated, until an activation command is issued when transient monitoring via a monitoring tool is in progress. In other words, activation command for perimeter control agents is issued when two conditions are met, i.e., transient monitoring should be on and an attack is already in progress.

In an embodiment, a logic table is provided that includes details regarding when and for how long a transient monitor is activated and remains activated. For perimeter control agents, Common Vulnerabilities and Exposures (CVE) specific firewall port filtering scripts are used and are developed as part of the SNORT rules solution. It will be apparent to a person skilled in the art that the invention is not limited to implementation example of CVE code and SNORT rules, which have been used for the purpose of illustration only. These port filtering scripts are dynamically linked with the transient monitor, by combining the benefits of both monitoring on demand and perimeter control. By way of an example, when the transient monitor is activated and it detects that an attack in progress, the transient monitor turns on perimeter control scripts at the firewall. The firewall is pre-loaded with a list of CVE ID specific port filtering scripts. The activation and de-activation of these scripts are controlled by the transient monitor. Thus, stakeholders are provided with an added assurance against security attacks immediately after zero-day attack or discovery of new defects in one or more software components.

In addition to activating the compensating control and deploying the continuous monitoring tools, risk management device 102 also determines an insurance aggregate limit and an insurance premium for each of the plurality of software components. The insurance aggregate limit and the insurance premium are determined based on security risk factors computed for the plurality of software components and asset values associated with them. This is explained in detail in conjunction with FIG. 6.

Figure 4:
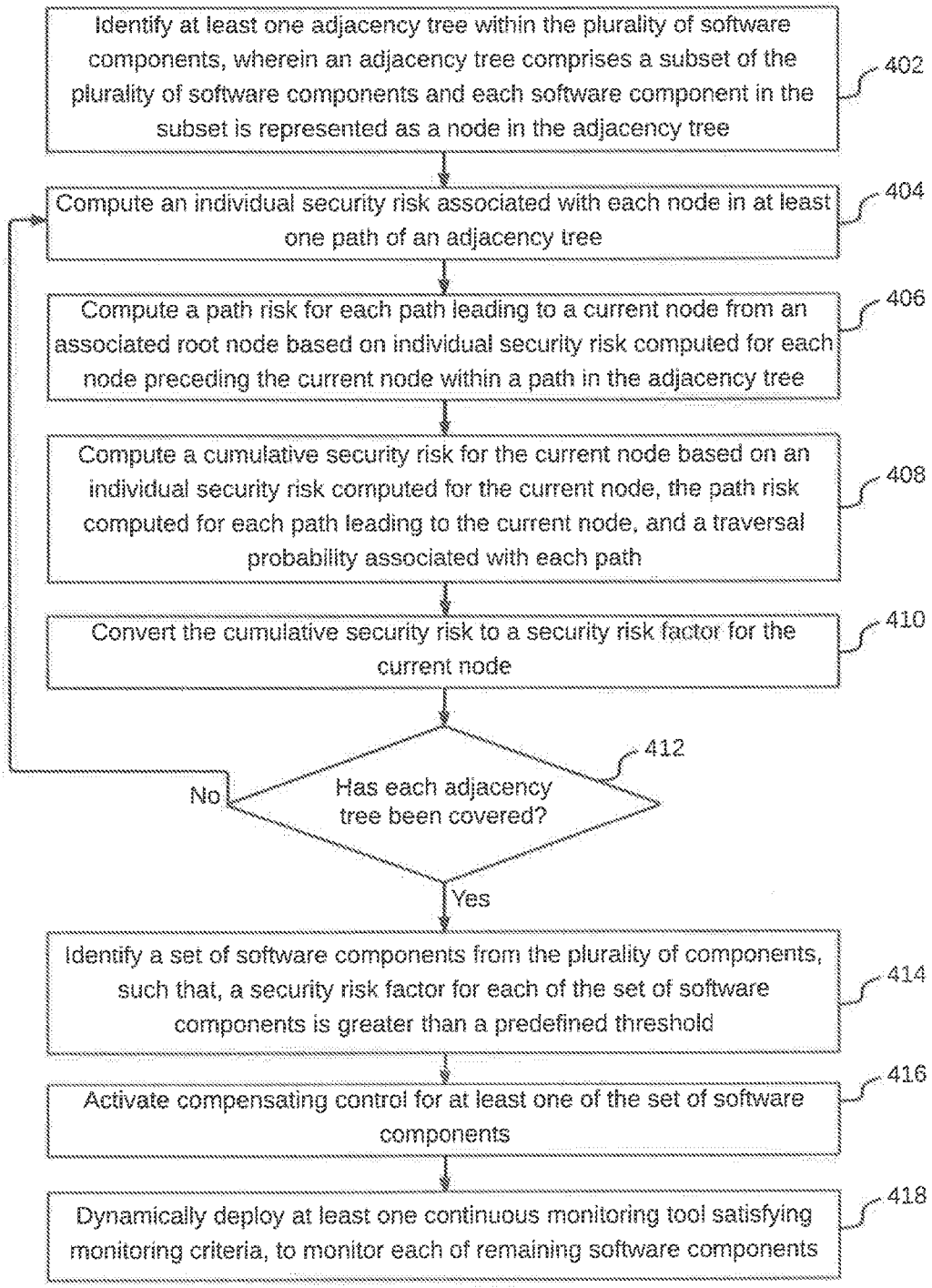
FIG. 4 illustrates a second flowchart of a method for software risk management within an IT infrastructure, in accordance with another embodiment.

Referring now to FIG. 4, a second flowchart of a method for software risk management within an IT infrastructure is illustrated, in accordance with another embodiment. Risk management device 102 computes security risk factors for a plurality of software components based on available executables for the plurality of software components. The security risk factors are computed based on interdependencies amongst the plurality of software components. These interdependencies are based on one or more data-flow interdependencies between the plurality of software components and human usage interdependencies relating to the usage of the plurality of software components.

To this end, at step 402, risk management device 102 identifies one or more adjacency trees within the plurality of software components. Each adjacency tree includes a subset of the plurality of software components and each software component in the subset is represented as a node in the adjacency tree. In other words, one adjacency tree is not dependent on any other adjacency tree, unless there is only one adjacency tree that includes each of the plurality of software components. The nodes within an adjacency tree have interdependencies (inputs and outputs) amongst them only and would be independent of nodes in other adjacency trees. Interdependency within an adjacency tree is established by an input node and an output node, such that, the input node receives input from one or more nodes within the adjacency tree and the output node provides input to one or more nodes within the adjacency tree. In an embodiment, while identifying adjacency trees, only server activation points of the software components are considered. Moreover, when one server activates more than one client sites, then each client site is not separately counted for.

An adjacency tree includes one or more paths and each path further includes one or more of: a root node, a destination node, and zero or more middle nodes. A root node is the first node in a path and a destination node is the last node in that path. Thus, each path definitely includes a root node and a destination node. In other words, the root node is always an output node, while the destination node is always an input node. A path may or may not include one or more middle nodes and each middle node acts both as the input node and the output node.

The computation of the security risk factors starts with a root node, and the root node represents a software component that runs without any input dependency from another software component. Examples of such software components may include, but are not limited to MICROSOFT OFFICE® or ACROBAT READER®. Similarly, examples of software components that are non-root nodes may include, but are not limited to a database server, that may receive the output from other software components.

At step 404, risk management device 102 computes an individual security risk associated with each node in each path of each adjacency tree. In other words, individual security risk is computed for each of the plurality of software components. This has been explained in detail in step 302 of FIG. 3. Thereafter, one particular adjacency tree is selected in no particular order and for each root node in the adjacency tree, a current node is selected. A current node is either a middle node or a destination node and will never be a root node.

For the selected adjacency tree, at step 406, risk management device 102 computes a path risk for each path leading to the current node from an associated root node. In other words, path risk is computed for every path that leads to the current node. A path risk for a path leading to the current node is computed based on individual security risk for each node preceding the current node within the path. In an embodiment, joint probability of all nodes that are included in the path is determined to compute the path risk. The computation of path risk is explained in detail in conjunction with exemplary embodiment given in FIG. 5.

Thereafter, at step 408, risk management device 102 computes a cumulative security risk for the current node based on an individual security risk computed for the current node and the path risk computed for each path leading to the current node. In an embodiment, while computing the cumulative security risk for the current node, risk management device 102 applies a traversal probability of a path to an associated path risk. This is explained in detail in conjunction with the exemplary embodiment given in FIG. 5. The traversal probability indicates a probability of traversing the path to reach the current node in practical operating environment. This probability is a design parameter, which may be computed based on historic path traversal data and may be refined based in user input received via UI 116.

At 410, risk management device 102 converts the cumulative security risk computed for the current node to a security risk factor for the current node. The conversion of security risk to security risk factors has been explained in detail in conjunction with FIG. 3. The selection of the current node to perform steps 406 to 410, is an iterative process, such that, in the first iteration, the current node is the node immediately succeeding the root node. In the second iteration, the current node would be the node immediately succeeding the current node of the first iteration. These iterations are continued till the destination node of every path in the adjacency tree has been covered. In other word, these iterations are continued till each and every node (software component) in the adjacency tree has been covered for computation of cumulative security risk and an associated security risk factor.

Thereafter, at step 412, a check is performed to determine whether each of the one or more adjacency trees have been covered. If one or more adjacency trees have not been covered, the control goes back to step 404, and a subsequent adjacency tree is selected to perform steps 404 to 410. Referring back to step 412, if each adjacency tree has been covered, risk management device 102, at step 414 identifies a set of software components from the plurality of components, such that, a security risk factor for each of the set of software components is greater than a predefined threshold. Thereafter, at step 416, risk management device 102, activate compensating control for one or more of the set of software components. At step 418, risk management device 102, dynamically deploys one or more continuous monitoring tools that satisfy the monitoring criteria to monitor each of remaining software components in the set of software components. Steps 414 to 418 have been discussed in detail in conjunction with FIG. 3.

In addition to activating the compensating control and deploying the continuous monitoring tools, risk management device 102 also determines an insurance aggregate limit and an insurance premium for each of the plurality of software components. The insurance aggregate limit and the insurance premium are determined based on security risk factors computed for the plurality of software components and asset values associated with them. This is explained in detail in conjunction with FIG. 6.

Figure 5:
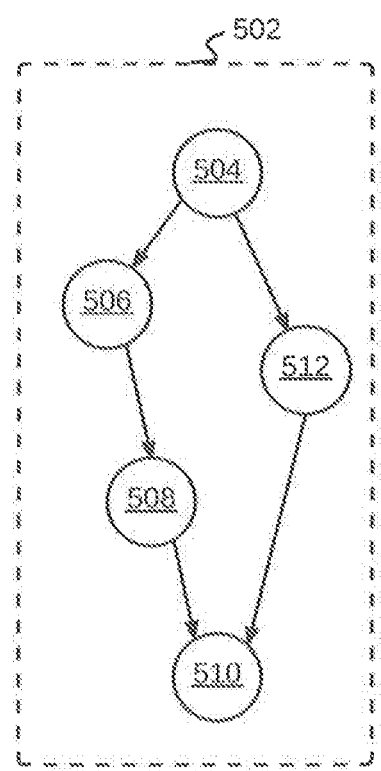
FIG. 5 illustrates computation of cumulative security risks within an adjacency tree identified from a plurality of software components, in accordance with an exemplary embodiment.

Referring now to FIG. 5, computation of cumulative security risks within an adjacency tree 502 identified from a plurality of software components is illustrated, in accordance with an exemplary embodiment. In this exemplary embodiment, adjacency tree 502 includes five nodes (representing different software components), i.e., a root node 504, a node 506, a node 508, a destination node 510, and a node 512. Each of nodes 506, 508, and 512 are middle nodes. To start with, an individual security risk is computed for each of these five nodes based on the method discussed in detail in conjunction with FIG. 3. The individual risk for a node is depicted as IR.

Adjacency tree 502 include two paths. The first path having a path ID: P1, is depicted as: "root node 504→node 506→node 508→destination node 510." Similarly, the second path having a path ID: P2 is depicted as: "root node 504→node 512→destination node 510." In this exemplary embodiment, we assume that all the nodes, except destination node 510, have been iterated through for computation of cumulative security risk.

For computation of cumulative security risk for destination node 510, path risks are first computed for P1 and P2, as both these paths lead to destination node 510. The path risk (represented as PR) for P1 is computed using equation 1 and for P2 using equation 2 given below:

$$PR(P1) = [IR(\text{root node } 504)]*[IR(\text{node } 506)]*[IR(\text{node } 508)]*[IR(\text{destination node } 510)] \quad (1)$$

$$PR(P2) = [IR(\text{root node } 504)]*[IR(\text{node } 512)]*[IR(\text{destination node } 510)] \quad (2)$$

Once PR (P1) and PR (P2) have been computed, a cumulative security risk for destination node 510 is computed using equation 3 given below:

$$\text{Cumulative Security Risk (destination node 510)} = [IR(\text{destination node } 510)] + C1[PR(P1)] + C2[PR(P2)] \quad (3)$$

where,

C1 is the probability that P1 will be traversed from root node 504 to reach destination node 510 in practical operating environment; and C1 is the probability that P2 will be traversed from root node 504 to reach destination node 510 in practical operating environment.

In an embodiment, the methods discussed in FIGS. 4 and 5 are used to create an auditor risk rating tool that can be used by a security auditor. The risk rating tool includes a risk snapshot of all software components across an organization's, which can be used to rank and order all risks and Asset values. This enables the security auditor to determine the points or regions within the organization that have the largest risk exposure. Risk exposure is computed at the highest level, on a per-component basis and not at individual vulnerability basis. Furthermore, no user input is taken for each software risk, the entire computation and build-up is in-grown.

As discussed in the foregoing, each node risk, path risk, and asset value ordered risk is computed. These are then displayed via a dashboard of the tool along with a software interconnection graph that details interconnection amongst software components. Each one of the above are recomputed, when one or more nodes gets security risk disposed. In other words, an iterative computation is performed for each security incident disposition update.

To this end, the computed risk values, i.e., individual risk of each node, path risk, and asset value risk are provided to the dashboard. The risk tool also provides a UI for rank ordering by risk or by asset value. Risk disposition on a per software component basis is also provided. These capabilities are built based on executable review of software components and not based on risk data input provided by humans. In the current context, the risk data is developed in-grown within the tool, without any number-in/number-out type calculation. This is a significant capability and novel feature compared to the existing industry tools.

Figure 6:
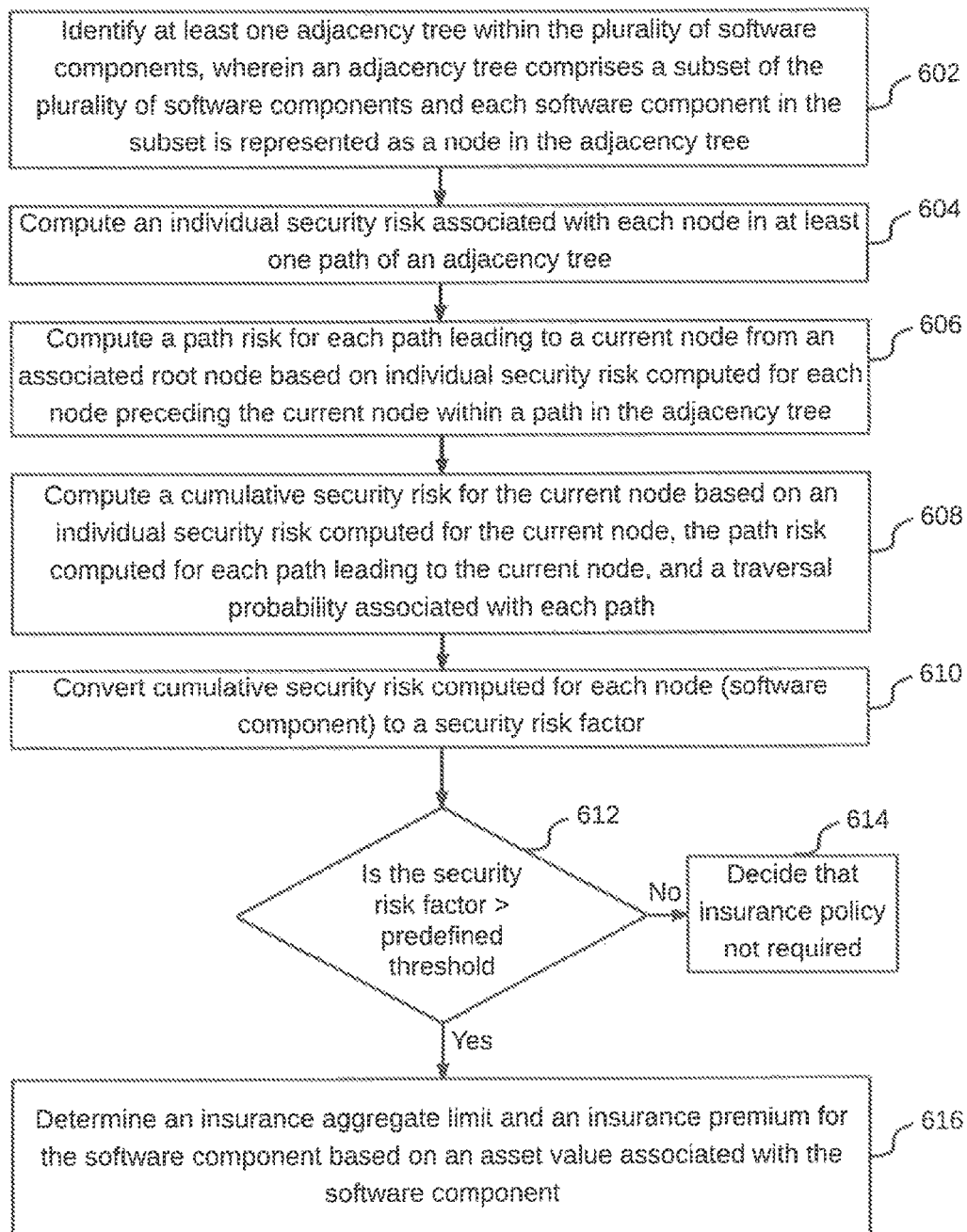
FIG. 6 illustrates a third flowchart of a method for determining an insurance aggregate limit and an insurance premium for a plurality of software components within an IT infrastructure, in accordance with an embodiment.

Referring now to FIG. 6, a third flowchart of a method for determining an insurance aggregate limit and an insurance premium for a plurality of software components within an IT infrastructure is illustrated, in accordance with an embodiment. Risk management device 102 performs steps 602 to 610, which have been explained in detail in conjunction with steps 402 to 410 in FIG. 4. After step 610, a security risk factor is computed for each of the plurality of software components within the IT infrastructure. In an embodiment, security risk factors may be computed using the method described in conjunction with FIG. 3.

At step 612, risk management device 102 compares the security risk factor computed for each software component with a predefined threshold, for example, a security risk factor of 7. The predefined threshold may be fixed based upon an organization's appetite for security risks, recent security incidents track record, assets under consideration and their respective tangible and other values.

When security risk factor for the software component is less than the predefined threshold, risk management device 102 decides, at step 614, that insurance policy is not required for that software component. Referring back to step 612, when the security risk factor is greater than the predefined threshold, risk management device 102, at step 616, determines an insurance aggregate limit and an insurance premium for the software component based on an associated security risk factor and an associated asset value. This is steps 612 to 616 are repeated for each software component within the IT infrastructure to determine whether these software components require an insurance policy and the insurance premium, if the insurance policy is required.

The insurance premium is an insurable interest value that combines asset values and security risk factors associated with the software components. The insurance premium may be determined as a multiplier of the asset value to a percentage value of risk (potential liability), which is then mapped to slabs or quartiles as per the insurance policy. In an embodiment, the user via UI 116 may perform a manual override, when the organization, for financial or any other external factors, prefers to over-insure or under-insure the insurance policy.

Asset values associated with software components are computed based upon business criticality, cost of replacement, depreciation and Capital Expenditure (CapEX) versus Operational Expenses (OPEX) considerations. Asset values are a function of the platform type, and business criticality of the functions the said platform caters to and are computed from the hosts (or servers) where the respective software components execute. In an embodiment, a prepopulated look up table that includes different monetary values for Windows servers, Unix servers, Linux servers, etc, may be used to computed the asset values.

Figure 7:
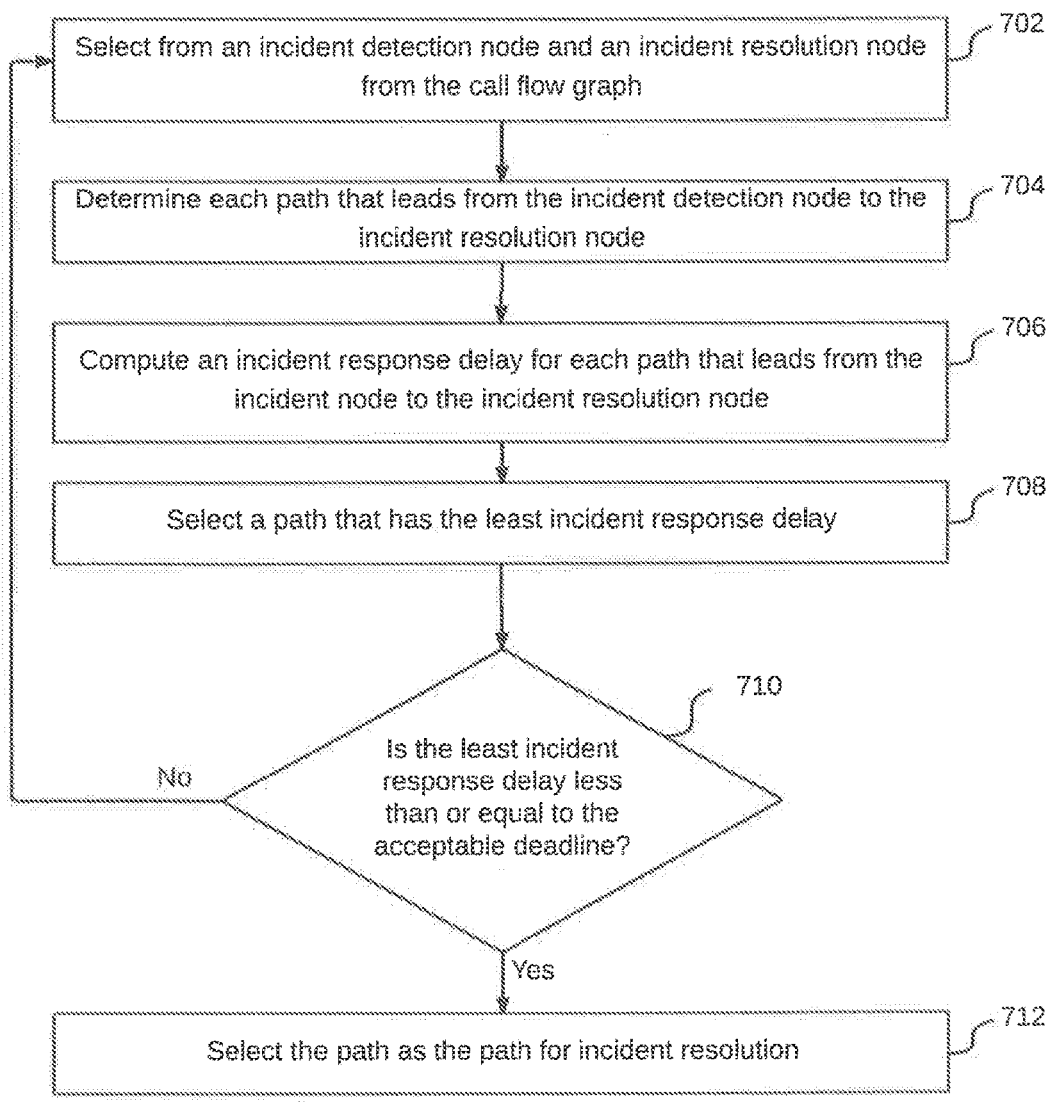
FIG. 7 illustrates a fourth flowchart of a method for optimizing security incident timeline to guarantee incident resolution within a deadline, in accordance with an embodiment.

Referring now to FIG. 7, a fourth flowchart of a method for optimizing security incident timeline to guarantee incident resolution within a deadline is illustrated, in accordance with an embodiment. The adjacency tree as discussed in FIGS. 4 and 5, may be referred to as a call flow graph that depicts interconnections between the plurality of software components. At step 702, an incident detection node and an incident resolution node is selected from the call flow graph. The incident detection node (or a root node) is the software component that detects a security defect and the incident resolution node (a middle node or a destination node) is the software component that mitigates (or disposes) the security defect. At step 704, each path (dataflow and human-action-dependence flow paths) that leads from the incident detection node to the incident resolution node is determined. This is similar to the method discussed in FIG. 4 for determining all possible paths from a root node to any other node (destination or middle node) within an adjacency tree.

Thereafter, at step 706, an incident response delay is computed for each path that leads from the incident node to the incident resolution node. An incident response delay for a path is the addition of execution delay at each node that is included in the path. After incident response delay has been computed for each path, at step 708, a path that has the least incident response delay is selected. To ensure resolution within the deadline, at step 710, a check is performed to determine whether the least incident response delay for the path is less than or equal to the acceptable deadline. If not, the control moves back to step 702. However, when the least incident response delay is less than or equal to the acceptable deadline, at step 712, the path is selected as the path for incident resolution. This ensures that the incident resolution and response (from detection to disposition to security analyst and possible mitigation) occurs within the shortest possible time.

Figure 8:
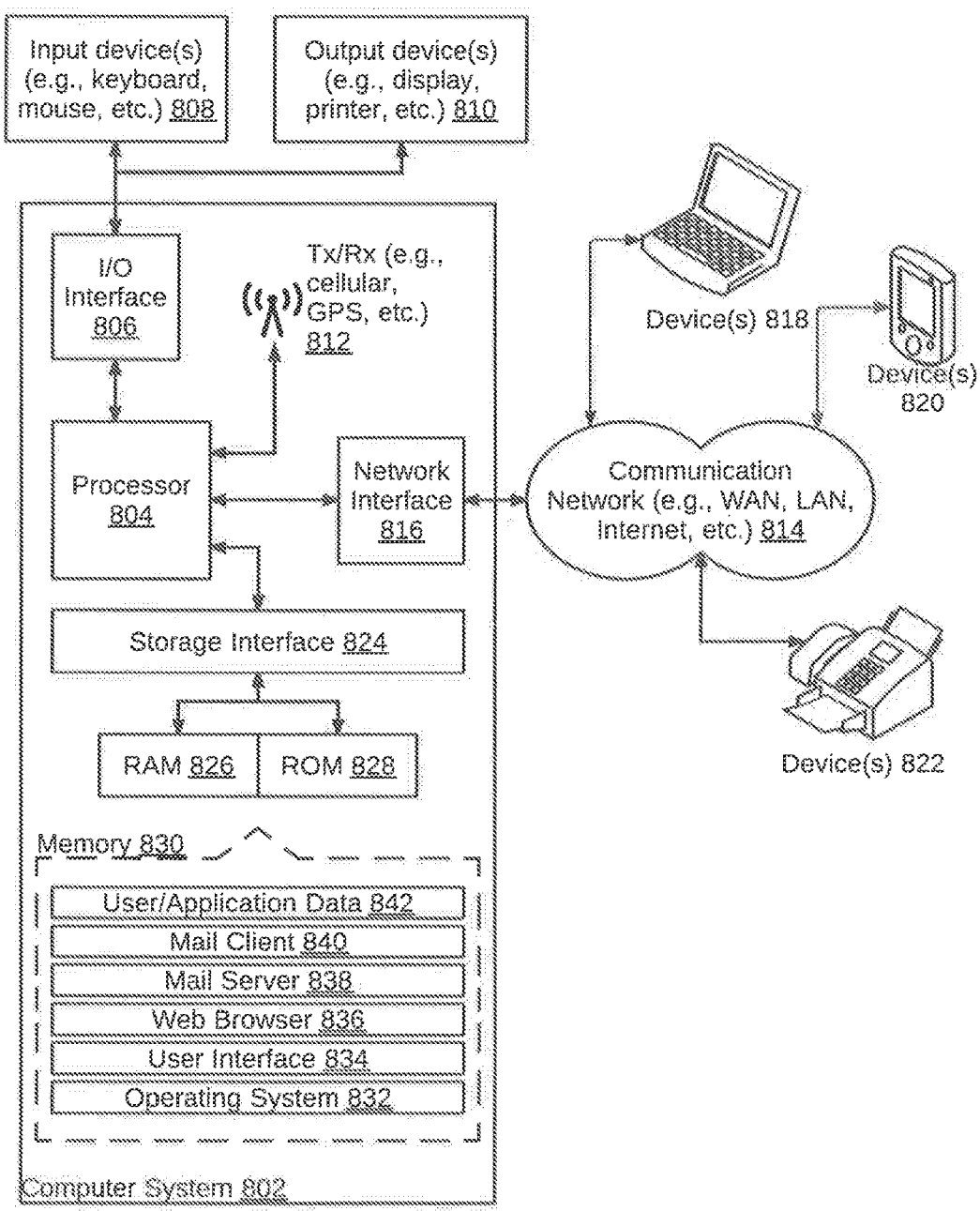
FIG. 8 illustrates a block diagram of an exemplary computer system for implementing various embodiments.

FIG. 8 is a block diagram of an exemplary computer system for implementing various embodiments. Computer system 802 may comprise a central processing unit ("CPU" or "processor") 804. Processor 804 may comprise at least one data processor for executing program components for executing user- or system-generated requests. A user may include a person, a person using a device such as such as those included in this disclosure, or such a device itself. Processor 804 may include specialized processing units such as integrated system (bus) controllers, memory management control units, floating point units, graphics processing units, digital signal processing units, etc. The processor may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 804 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 804 may be disposed in communication with one or more input/output (I/O) devices via an I/O interface 806. I/O interface 806 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 806, computer system 802 may communicate with one or more I/O devices. For example, an input device 808 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 810 may be a printer, fax machine, video display (e.g., cathode ray tube (CRT), liquid crystal display (LCD), light-emitting diode (LED), plasma, or the like), audio speaker, etc. In some embodiments, a transceiver 812 may be disposed in connection with processor 804. Transceiver 812 may facilitate various types of wireless transmission or reception. For example, transceiver 812 may include an antenna operatively connected to a transceiver chip (e.g., TEXAS® INSTRUMENTS WIL-INK WL1283® transceiver, BROADCOM® BCM4550IUB8® transceiver, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, processor 804 may be disposed in communication with a communication network 814 via a network interface 816. Network interface 816 may communicate with communication network 814. Network interface 816 may employ connection protocols including, without limitation, direct connect, Ethernet (e.g., twisted pair 50/500/5000 Base T), transmission control protocol/internet protocol (TCP/IP), token ring, IEEE 802.11a/big/n/x, etc. Communication network 814 may include, without limitation, a direct interconnection, local area network (LAN), wide area network (WAN), wireless network (e.g., using Wireless Application Protocol), the Internet, etc. Using network interface 816 and communication network 814, computer system 802 may communicate with devices 818, 820, and 822. These devices may include, without limitation, personal computer(s), server(s), fax machines, printers, scanners, various mobile devices such as cellular telephones, smartphones (e.g., APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 802 may itself embody one or more of these devices.

In some embodiments, processor 804 may be disposed in communication with one or more memory devices (e.g., RAM 826, ROM 828, etc.) via a storage interface 824. Storage interface 824 may connect to memory 830 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory 830 may store a collection of program or database components, including, without limitation, an operating system 832, user interface application 834, web browser 836, mail server 838, mail client 840, user/application data 842 (e.g., any data variables or data records discussed in this disclosure), etc. The operating system 832 may facilitate resource management and operation of the computer system 802. Examples of operating systems 832 include, without limitation, APPLE® MACINTOSH® OS X platform, UNIX platform, Unix-like system distributions (e.g., Berkeley Software Distribution (BSD), FreeBSD, NetBSD, OpenBSD, etc.), LINUX distributions (e.g., RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 834 may facilitate display, execution, interaction, manipulation, or operation of program components through textual or graphical facilities. For example, user interfaces may provide computer interaction interface elements on a display system operatively connected to the computer system 802, such as cursors, icons, check boxes, menus, scrollers, windows, widgets, etc. Graphical user interfaces (GUIs) may be employed, including, without limitation, Apple® Macintosh® operating systems' AQUA® platform, IBM® OS/2® platform, MICROSOFT® WINDOWS® platform (e.g., AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH® platform, etc.), or the like.

In some embodiments, the computer system 802 may implement a web browser 836 stored program component. The web browser 836 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, the computer system 802 may implement a mail server 838 stored program component. The mail server may be an Internet mail server such as MICROSOFT® EXCHANGE® mail server, or the like. The mail server 838 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. The mail server 838 may utilize communication protocols such as internet message access protocol (IMAP), messaging application programming interface (MAPI), Microsoft Exchange, post office protocol (POP), simple mail transfer protocol (SMTP), or the like. In some embodiments, the computer system 802 may implement a mail client 840 stored program component. The mail client 840 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 802 may store user/application data 842, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments provide method and device for software risk management within an IT infrastructure. The method provides end-to-end cyber security risk modeling for multiple software components (provided by third party) in a corporate cloud. This risk modelling enables risk mitigations across IT and finance industries and convergence of the security risk and financial risk industries. The method further provides a tradeoff between compensating control vis-à-vis software security risk prevention. Software security risks are mitigated by selectively using compensating control and adaptive deployment of monitoring tools based upon real-time computation of audited security risk factors.

The specification has described a method and device for software risk management within an IT infrastructure. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of software risk management within an Information Technology (IT) infrastructure, the method comprising:
computing, by a risk management device, security risk factors for a plurality of software components based on availability of executables for the plurality of software components;
identifying, by a risk management device, a set of software components from the plurality of components in response to computing, wherein a security risk factor for each of the set of software components is greater than a predefined threshold;
activating, by the risk management device, compensating control for at least one of the set of software components, when a compensating control mechanism is available for each of the at least one software component and the compensating control mechanism satisfies control criteria; and
dynamically deploying, by the risk management device, at least one continuous monitoring tool satisfying monitoring criteria, to monitor each of at least one remaining software component in the set of software components for a predefined duration, wherein a compensating control mechanism is not available for each of the at least one remaining software component;
wherein the security risk factors are computed based on interdependencies amongst the plurality of software components, the interdependencies are based on at least data-flow interdependencies between the plurality of software components and human usage interdependencies relating to the usage of the plurality of software components;
the computing the security risk factors based on interdependencies comprises:
identifying at least one adjacency tree within the plurality of software components,
wherein an adjacency tree from the at least one adjacency tree comprises a subset of the plurality of software components and each software component in the subset is represented as a node in the adjacency tree, and
wherein the adjacency tree comprises at least one path and each of the at least one path comprises at least one of a root node, a destination node, and zero or more middle nodes, wherein a root node is the first node and a destination node is the last node in each of the at least one path.

2. The method of claim 1, further comprising:
computing an individual security risk associated with each node in the at least one path; and
computing a path risk for each path leading to a current node from an associated root node, wherein a path risk for a path leading to the current node is computed based on individual security risk computed for each node preceding the current node within the path, and wherein the current node is one of a middle node or a destination node.

3. The method of claim 2 further comprising computing a cumulative security risk for the current node based on an individual security risk computed for the current node and the path risk computed for each path leading to the current node.

4. The method of claim 3, wherein computing the cumulative security risk comprises applying a traversal probability of a path to an associated path risk, and wherein the traversal probability indicates a probability of traversing the path to reach the current node.

5. The method of claim 3 further comprising converting the cumulative security risk to a security risk factor for the current node.

6. The method of claim 1, further comprising determining, by the risk management device, an insurance aggregate limit and an insurance premium for a software component, based on a security risk factor computed for the software component and an asset value associated with the software component.

7. The method of claim 1, wherein a security risk factor for a software component from the plurality of software components is computed based on individual security risk of the software component without dependency on other software components in the plurality of software components.

8. The method of claim 1, wherein the predefined duration is updated in real time.

9. A risk management device for managing software risk in an Information Technology (IT) infrastructure, the risk management device comprising:
- a processor; and
- a memory communicatively coupled to the processor, wherein the memory stores processor instructions, which, on execution, causes the processor to:
  - compute security risk factors for a plurality of software components based on availability of executables for the plurality of software components;
  - identify a set of software components from the plurality of components in response to computing, wherein a security risk factor for each of the set of software components is greater than a predefined threshold;
  - activate compensating control for at least one of the set of software components, when a compensating control mechanism is available for each of the at least one software component and the compensating control mechanism satisfies control criteria; and
  - dynamically deploy at least one continuous monitoring tool satisfying monitoring criteria, to monitor each of at least one remaining software component in the set of software components for a predefined duration, wherein a compensating control mechanism is not available for each of the at least one remaining software component;
  - wherein the security risk factors are computed based on interdependencies amongst the plurality of software components, the interdependencies are based on at least data-flow interdependencies between the plurality of software components and human usage interdependencies relating to the usage of the plurality of software components;
  - the processor instructions further cause the processor to compute the security risk factor based on interdependencies by steps of:
    - identifying at least one adjacency tree within the plurality of software components,
    - wherein an adjacency tree from the at least one adjacency tree comprises a subset of the plurality of software components and each software component in the subset is represented as a node in the adjacency tree, and
    - wherein the adjacency tree comprises at least one path and each of the at least one path comprises at least one of a root node, a destination node, and zero or more middle nodes, wherein a root node is the first node and a destination node is the last node in each of the at least one path.

10. The risk management device of claim 9, wherein the processor instructions further cause the processor to:
- compute an individual security risk associated with each node in the at least one path; and
- compute a path risk for each path leading to a current node from an associated root node, wherein a path risk for a path leading to the current node is computed based on individual security risk computed for each node preceding the current node within the path, and wherein the current node is one of a middle node or a destination node.

11. The risk management device of claim 10, wherein the processor instructions further cause the processor to compute a cumulative security risk for the current node based on an individual security risk computed for the current node and the path risk computed for each path leading to the current node.

12. The risk management device of claim 11, wherein to compute the cumulative security risk the processor instructions further cause the processor to apply a traversal probability of a path to an associated path risk, and wherein the traversal probability indicates a probability of traversing the path to reach the current node.

13. The risk management device of claim 11, wherein the processor instructions further cause the processor to convert the cumulative security risk to a security risk factor for the current node.

14. The risk management device of claim 9, wherein the processor instructions further cause the processor to determine an insurance aggregate limit and an insurance premium for a software component, based on a security risk factor computed for the software component and an asset value associated with the software component.

15. The risk management device of claim 1, wherein a security risk factor for a software component from the plurality of software components is computed based on individual security risk of the software component without dependency on other software components in the plurality of software components.

16. A non-transitory computer-readable storage medium having stored thereon, a set of computer-executable instructions causing a computer comprising one or more processors to perform steps comprising:
- computing, by a risk management device, security risk factors for a plurality of software components based on availability of executables for the plurality of software components;
- identifying, by a risk management device, a set of software components from the plurality of components in response to computing, wherein a security risk factor for each of the set of software components is greater than a predefined threshold;
- activating, by the risk management device, compensating control for at least one of the set of software components, when a compensating control mechanism is available for each of the at least one software component and the compensating control mechanism satisfies control criteria; and
- dynamically deploying, by the risk management device, at least one continuous monitoring tool satisfying monitoring criteria, to monitor each of at least one remaining software component in the set of software components for a predefined duration, wherein a compensating control mechanism is not available for each of the at least one remaining software component;
- wherein the security risk factors are computed based on interdependencies amongst the plurality of software components, the interdependencies are based on at least data-flow interdependencies between the plurality of software components and human usage interdependencies relating to the usage of the plurality of software components;
- the instructions further cause the computer to compute the security risk factor based on interdependencies by steps of:
  - identifying at least one adjacency tree within the plurality of software components, wherein an adjacency tree from the at least one adjacency tree comprises a subset of the plurality of software components and each software component in the subset is represented as a node in the adjacency tree, and wherein the adjacency tree comprises at least one path and each of the at least one path comprises at least one of a root node, a destination node, and zero or more middle nodes, wherein a root node is the first node and a destination node is the last node in each of the at least one path.

\* \* \* \* \*